Sept. 16, 1958 W. H. COLBERT ET AL 2,852,415
ELECTRICALLY CONDUCTING COATED GLASS OR CERAMIC
ARTICLES SUITABLE FOR USE AS A LENS, A WINDOW
OR A WINDSHIELD, OR THE LIKE
Filed Oct. 29, 1952 2 Sheets-Sheet 1

*INVENTORS*
WILLIAM H. COLBERT
BY ARTHUR R. WEINRICH
WILLARD L. MORGAN

Nobbe & Swope
ATTORNEYS

Sept. 16, 1958 W. H. COLBERT ET AL 2,852,415
ELECTRICALLY CONDUCTING COATED GLASS OR CERAMIC
ARTICLES SUITABLE FOR USE AS A LENS, A WINDOW
OR A WINDSHIELD, OR THE LIKE
Filed Oct. 29, 1952 2 Sheets-Sheet 2

INVENTORS
WILLIAM H. COLBERT
BY ARTHUR R. WEINRICH
WILLARD L. MORGAN

Nobbe & Swope
ATTORNEYS

United States Patent Office 2,852,415
Patented Sept. 16, 1958

2,852,415

ELECTRICALLY CONDUCTING COATED GLASS OR CERAMIC ARTICLES SUITABLE FOR USE AS A LENS, A WINDOW OR A WINDSHIELD, OR THE LIKE

William H. Colbert and Willard L. Morgan, Pittsburgh, Pa., and Arthur R. Weinrich, Dallas, Tex., assignors to Libbey-Owens-Ford Glass Company, Toledo, Ohio, a corporation of Ohio Application October 29, 1952, Serial No. 317,472

23 Claims. (Cl. 117—211)

The present invention relates to electrically conducting coated glass or ceramic articles suitable for many uses, including light transmissive electrically conducting optical articles such as a lens, a window or a windshield, or the like, which are unique in that they are coated with a highly transparent electrically conducting coating, and including other articles of transparent or substantially non-transparent nature such as space heaters, electrical resistances and conductors, static dissipators, light transparent radio frequency shields, and flat conductors useful for producing electrical fields.

The articles comprise a body of glass or other ceramic material of siliceous nature which may be transparent or opaque in which a continuous layer is formed upon such body by depositing thereon by molecular deposition within a vacuum either by thermal evaporation or by sputtering an intimate molecular mixture of a metal and a metallic inorganic di-electric compound, and in a layer which is substantially uniform in thickness and the proportion of metal to the di-electric compound in such layer and the thickness of said layer are such that said layer is electrically conductive. By such a construction it has been found that not only are products produced which are strongly adherent and durable, but they are of a maximum light transmission when so desired and of a very high degree of electrical conductivity when even very thin films of the intimate mixture of metal and a di-electric compound are thus used.

The application of products having both electrical properties and light transmissive or other optical properties such as reflection or specific opacity to electrical waves or various parts of the visible spectrum calls for a careful designing of the products to each particular problem. More important, since most electrical problems involve the specific requirements of certain energy flows at very specific voltage or current requirements, the products generally have to be built to a specific or limited range of electrical conductivity or electrical resistance as defined by overall ohms resistance for a certain length, or more particularly, by the factor of ohms per unit of square area in dealing with the flat areas such as in many of the products herein described.

It is one of the advantages of the present invention that products of an extremely wide range of electrical properties varying in electrical resistance from a few ohms per square up to a value approaching the conductivity of uncoated glass (approximately 1200 megohms) may be readily prepared as stable articles in which the value of resistance may be controlled with great accuracy.

Thus, in the production of static dissipating coatings, such as those suitable for instrument faces or transparent work table tops, it is merely desirable that these be capable of carrying relatively small currents of a few milliamperes only and the electrical resistance may generally be of most any value. On the other hand, if such a static dissipating coating is to be employed upon a window or airplane canopy, it is generally desirable that such window be also transparent both to light and to radio frequency signals and in such cases the electrical conductivity should be held well above 50,000 ohms per square. Conversely, it is apparent that for shielding radio frequency such as may be generated in an ordinary fluorescent lighting tube it is desirable to have a highly light transparent electrically conducting coating which is also very highly conductive for electricity and in this case it would be desirable that the coating be of less resistance than 1,000 ohms per square.

The present invention also relates particularly to the production of a novel type of windshield or window, or other transparent optical articles such as a lens or goggle which may be electrically heated by passage of current through the electrically conducting transparent coating deposited thereon. In such articles, and also in the case of space heaters such as may be employed in walls of buildings as overall heat radiators which of course need not be transparent, there are very high requirements for electrical conduction and in these cases it is highly desirable that the electrical resistances be lower than 200 ohms per square and as low as a few ohms per square. However, in these cases, as well as in the forming of flat or contoured glass or ceramic bodies, having electrically conductive coatings thereon employed for the purposes of setting up electrical fields, a specific electrical conduction or electrical resistance value is generally desired dependent upon the voltages available in such installations and the actual current flows desired.

Attempts to prepare electrically conducting articles, and particularly transparent electrically conducting articles, by deposition, by thermal evaporation in a vacuum, or by sputtering have not been successful where it has been desired to have a product of over 5,000 ohms per square since in order to secure such high resistances the metal coatings had to be of only a few molecules thickness and the inventors have found that when such coatings of less than 100 Angstrom units or 25 molecules thickness were prepared, that it was impossible to secure duplicable results and that the values of electrical resistance secured were extremely high and extremely variable. Such products also lacked generally any hardness or resistance to wiping off from the siliceous or glass surfaces since the metals employed did not stick directly to such surfaces. Where it was desired to produce products of relatively high conductivity or lower ohms resistance than the 5,000 ohms per square figure given, it was found that again, the failure of the metal to stick to the siliceous surfaces prevented a production of reproducible products and led to extremely erratic results in electrical conductivity and also in light transmission.

The present application is a continuation-in-part of our prior copending application Serial No. 88,208, filed April 18, 1949, now Patent No. 2,628,727, which in turn is a continuation-in-part of our prior application Serial No. 541,964, filed June 24, 1944, now United States Patent No. 2,482,054.

In our prior copending application Serial No. 88,208 the inventors have disclosed one means of preparing electrically conductive articles particularly of a transparent nature in which the desired adhesion and resultant durability were secured by depositing first upon the siliceous surfaces a uniform continuous coating of a metallic inorganic compound such as a metal oxide, metal sulfide, or metal halide. Upon such coating there was then deposited a metal layer and when the metals were deposited upon such metallic compound surfaces they were found to give continuous uniform metal layers which were highly adherent to the metal compound and in turn to the glass or siliceous surfaces. By the use of such metal compound layers upon the siliceous surfaces it was found possible to deposit metal coatings which were extremely thin but which were continuous and uniform in nature in contrast to the erratic results resulting from direct deposition upon the uncoated siliceous surfaces where these continuous coatings were secured.

In the present invention there is formed a continuous layer which consists of an intimate molecular mixture of a metal and of a metallic inorganic compound. In some cases this layer may be deposited directly upon the surface of a support body or in some cases it may appear as an intermediate layer in a composite structure. The inorganic metallic compound provides adhesion between the mixed composition layer and the siliceous support and also provides adhesion to the metal which is molecularly mixed throughout with the inorganic compound. For such compositions it is found that the products are strongly adhered to the supports and are durable and hard, and that as the metal atoms are deposited in the intimate molecular mixture with the metallic inorganic di-electric compound that they are not free to move and are located in such mixture in accordance with the manner in which they are laid down by the molecular deposition method of either thermal evaporation within a vacuum or by sputtering under certain circumstances.

It would be expected that when a metal which is in itself electrically conducting and when a metallic inorganic di-electric compound which in itself is non-electrically conducting, are deposited as a mixture that the non-electrically conducting di-electric would cause the product to be non-electrically conducting. It has been found however, that when such a mixture is formed in which the mixture is an intimate molecular mixture where the materials are essentially present in molecular condition that there is considerably more electrical conductivity than might be otherwise expected and it is presumed that there must be some method of conduction across the extremely small insulating spaces provided by the separating of the metal molecules from each other by the insulating but very small metallic inorganic di-electric molecules.

While the conductivity secured from a given amount of metal when mixed in such intimate molecular mixture with a metallic inorganic di-electric compound, is not as large as it would be if the metal were present as a continuous solid metal layer, this results in providing one of the advantages of the present invention. For certain higher resistance films consisting of pure metal the thickness of the films was necessarily very low, such for example as less than 100 Angstrom units, or in some cases less than 20 Angstrom units. It is an advantage in the present method that much more material is required to secure a given degree of electrical conductivity and the films are thereby thicker and thereby more durable and wear resistant. Thus, it is possible to prepare for the first time stable high resistant coatings in which a small amount of metal is dispersed in a relatively large amount of metallic inorganic di-electric compound and thereby a fairly good thickness of hard durable nature may be employed. Thus, attempts to prepare high voltage static dissipators in the past by the use of coatings of metal of less than 20 Angstrom units or greater thicknesses were generally highly unsuccessful due to erratic values, unstable electrical character, and lack of resistance to rubbing of such extremely thin films. The method provides also the further advantage that metals subject to air oxidation or corrosion such as aluminum or silver, can be readily employed in that embedding such metal atoms in the di-electric results in protecting them from change under ordinary atmospheric conditions.

It is apparent that the embedding provides coatings which are of improved hardness as compared with those secured where the relatively soft metals such as gold or aluminum are used as separate layers. It is also apparent that with the metals molecularly dispersed with the di-electric that the metal atoms are fixed in definite position and are not free to diffuse around so that the products show immediate stable electrical values which do not change in storage nor readily change when the products are heated.

A further advantage coming from the present method and residing in the product produced is found in that by being able to incorporate the metal conductor into the di-electric as one layer it becomes possible to eliminate one interface which would be present if a continuous solid metal conducting layer was employed in the structure. It is thus possible to build electrically conducting light interference operating coatings without a separate discrete metal conducting layer which would introduce optical problems at its own interfaces. Thus, the present method permits constructing optical light interference filters and mirrors or dichroic mirrors or filters of a simplified construction.

The present invention may employ a continuous electrically conducting layer which consists of an intimate molecular mixture of a metal and metallic inorganic di-electric compound in which the proportion of the metal and metallic inorganic di-electric compound are substantially uniform throughout the layer. It may on the other hand employ such a continuous electrically conducting layer in which the proportion of metal and metallic inorganic di-electric compound varies continuously throughout its depth in actual ratio of the two or more materials.

The invention also comprises the use of such a continuously varying blended mix layer in which at one interface of such layer it is in contact with substantially pure metal and the layer changes from thereon by an increasing amount of di-electric up to the point where at the other interface the composition becomes practically pure di-electric. The invention also conceives the use of such a graded layer which is electrically conducting in itself as an intermediate layer which also operates to adhere an electrically conducting layer of pure metal either directly to the siliceous support or to a preceding coating, and also such mixed layers, that will serve as adhering layers between an underlying electrically conducting layer and adhere it to an overlying protective layer such as one of silica. In such constructions the mixed metal and di-electric layers operate not only from an adhesion functioning but from an optically functioning and from an electrically conducting functioning also in addition to that of the pure metal layer. Thus, it will be apparent that such a mixed metallic inorganic di-electric and metal layer, while primarily functioning as an adhesion layer to adhere a pure metal layer to some other film or support, will be in itself electrically conducting and will further provide the interesting optical feature that where it is graded from pure metallic inorganic di-electric in contact with the surface to which adhesion is to be secured, through a graded composition to a place where it is in contact with pure metal and is substantially pure metal, then the optical result is secured that an optical face between such graded mixed electrically conducting layer and the pure metal layer is avoided. Similarly, it is possible by the present method to also avoid an optical interface between a pure di-electric coating and the mixed electrically conducting layer where such is graded from pure di-electric in the mixture in contact with the pure di-electric film and by grading through an increasing amount of metal into contact with the pure metal, both optical interfaces may be avoided.

It will be apparent that depending upon the relative amounts of metal and metallic inorganic di-electric employed and the volumetric ratios between atoms of such materials, that the electrically conducting layers may in some instances have metal atoms which are surrounded substantially by di-electric atoms and in other cases may have di-electric atoms substantially surrounded by metal atoms and it is apparent that both such instances may occur within any particular film regardless of a relative volumetric composition. Thus, at best, the conduction would seem to be through small chains of a few metal atoms in contact and across insulating spaces where the di-electric breaks such possible direct contacting metal atoms. At any event it is apparent that the conductivity through such a film must be by some tortuous path and that the resistance to be secured would normally be higher for a given amount of metal than would occur if the same amount of metal was present in a uniform continuous solid film by itself. Thus, it also is apparent that in order to secure a desired amount of conductivity more metal must be employed than would be the case where two separate layers were employed, one of which was a metal compound and one of which was metal, as in our prior copending application Serial No. 88,208. This greater thickness of metal and consequent carrying amount of di-electric results in the conducting layers in the products being thicker than those secured in the preceding invention. By this invention we cannot only prepare transparent electrically conducting articles as disclosed in our prior application, but the present invention permits the forming of articles of any desired transparency or opacity and of any desired electrical conductivity.

It will be obvious that in forming an electrically conducting article in which the electrical conducting film is so extremely thin, it becomes very necessary that the coating be uniform in thickness as otherwise slight variations in thickness will result in variable electrical conductivity over the surface and development of greater heating at points of minimum thickness. Such development of hot spots may lead to burning out of such a film. In order to secure the necessary smooth continuous and uniformly thick conducting films, we prefer to deposit such electrically conducting coatings by molecular deposition such as thermal evaporation or sputtering. In the carrying out of such a method the metal may be evaporated from a filament or filaments properly spaced and loaded and as such metal is evaporated there may be simultaneously and concurrently evaporated from another filament or filaments properly spaced and loaded a charge of the di-electric so that the two materials are jointly and continuously deposited upon the support at the same time. When this is done and care is maintained that the two evaporations take the same time, the products will be substantially uniform in composition throughout. The thermal evaporation may also be carried out where the two materials, namely the metal and metallic inorganic compound are mixed together in a predetermined weight ratio and directly evaporated from the same filament. If the materials are of approximately the same evaporation rate properties, the film may be substantially uniform, and if they vary somewhat in rate of evaporation characteristics it is obvious that a graded film will be produced in which the faster evaporating material comprises a larger ratio of the first part of the film formed and a decreasing proportion of the film as it is progressively built up, and that the result is a graded film. Of course, such gradation within a film is subject not only to the relative evaporation rates and relative filament temperatures in such a case, but also is affected by the relative amounts of each material applied to the filaments, or applied in the mixture which is supplied to the filament.

As a further means in which we may produce our layers including di-electrics comprising metallic oxide we may proceed by thermally evaporating in a vacuum a mixture of two metals, one of which is relatively easy to oxidize such as aluminum, and one of which is relatively difficult to oxidize such as gold, and thereafter oxidizing this mixture by heating the deposit at an elevated temperature in the presence of oxygen to convert the one relatively easily oxidizable metal to an oxide. Obviously, other oxidizable materials such as the metallic sulfides, might also be converted to oxidized metallic compounds by heating the glass or other support which is precoated with the relatively non-oxidizable metal and metallic sulfide in a furnace to a high temperature in the presence of oxygen to convert the di-electric sulfide to a di-electric oxide in the electrically conducting mixed film.

A further way in which thin layers of metal and of metal oxides specifically may be produced in position upon a glass or other support is to proceed by applying a thin coating by sputtering a metal in a residual vacuum suitable for sputtering, in which the residual vacuum comprises in part oxygen such as from evacuating an air filled vessel. This sputtering may be carried out in methods well known in such art, employing the metal which is to be sputtered as an electrode; and in some cases where a metallic evacuation chamber is employed and this is used as one of the electrodes, a coating of the metal which is to be sputtered is first applied to the chamber walls. The latter is particularly advantageous where an A. C. rather than a D. C. current is employed. In such cases the other electrode would preferably be of the metal desired to be sputtered. Thus, if copper is sputtered in the presence of residual air, copper oxide deposits are formed upon the glass, and the coatings thus produced are extremely adherent to the glass. If the amount of residual oxygen is decreased by the injection into the chamber of inert gases it is possible to produce by sputtering in such a reduced oxygen atmosphere mixtures of copper and copper oxide. Surprisingly also, when the metals silver, gold, platnium and palladium, which are resistant to oxidation, are sputtered in a residual oxygen system it is found that the deposits are to a very large degree composed of oxides of these metals. By such a method then, it is possible with these metals, silver, gold, platinum and palladium, to produce electrically conducting layers of these metals with their oxides in intimate molecular mixture.

In view of the foregoing general remarks, it is an object of the present invention to produce an electrically conducting layer which is characterized by its electrical stability, its hardness, its ability to adhere to siliceous or other support surfaces, and by the fact that the layer may be accurately controlled as to electrical resistivity both in extremely low and extremely high ranges.

It is a further object of the present invention to provide an electrically conducting layer of the character described which comprises an intimate molecular mixture of metal and an inorganic di-electric metallic compound.

It is a further object of the present invention to provide an electrically conducting layer of the character described in the preceding paragraph in which the mixture of metal and di-electric metallic compound is substantially uniform throughout.

It is a further object of the present invention to provide an electrically conducting layer of the character described above in which the proportion of metal and di-electric metallic compound is selectively varied from one surface of the layer to the other.

It is a further object of the present invention to provide an electrically conducting layer which comprises an intimate molecular mixture of metal and an inorganic di-electric metallic compound, which is characterized by substantial thickness while having an electrical resistivity which may be in an extremely high range.

It is a further object of the present invention to provide an electrically conducting partially transparent layer comprising an intimate molecular mixture of a metal and an inorganic di-electric metallic compound.

It is a further object of the present invention to provide an electrically conducting layer in which the electrical resistivity may be controlled as desired between extremely low and extremely high ranges which may be useful in such varied products as electrically heated windows, windshields or the like, electric goggles, electric resistance units, electrostatic dissipators, radio frequency shields, space heaters, and the like.

It is a further object of the present invention to provide an electrically conducting layer comprising a mixture of metal and inorganic di-electric metallic compound which may be used as an intermediate graduated adhesive layer for adhering a metallic film to a support surface without producing an optical interface between the adhesive layer and the metallic film, and which may also avoid the occurrence of an optical interface provided the di-electric compound in the layer is substantially optically identical with the material providing the support surface.

It is a further object of the present invention to provide a novel method of producing electrically conducting layers as described in the preceding paragraphs.

It is a further object of the present invention to provide an approximately transparent electrically conducting layer useful in interference mirrors, dichroic filters and light transmissive radio frequency filters.

It is a further object of the present invention to provide a method for producing electrically conducting layers as described in the preceding paragraphs in which a metal and an inorganic di-electric metallic compound are deposited by molecular deposition simultaneously and concurrently on a support surface.

It is a further object of the present invention to provide a method of producing an electrically conducting layer as described in the preceding paragraph in which the metal and di-electric compound are provided in the form of a mixture and are evaporated either simultaneously and concurrently or in an overlapping sequence from a single filament.

It is a further object of the present invention to provide a method for producing electrically conducting layers of the character described in which the metal and the di-electric metallic compound are evaporated either simultaneously and concurrently or in an overlapping timed sequence from separate filaments.

It is a further object of the present invention to provide a method for producing electrically conducting layers as described above in which a metal is sputtered in a residual vacuum containing oxygen and in which the metal is either of a group relatively difficult to oxidize or in which the amount of residual oxygen is controlled so as to prevent complete oxidation when the metal is relatively easily oxidized.

It is a further object of the present invention to provide a method for producing electrically conducting layers of the character described in which a mixture of a plurality of metals, one of which is relatively difficult to oxidize and another of which is relatively easy to oxidize, are deposited as an intimate molecular mixture on a support surface, subsequent to which the deposited layer is heated in the presence of oxygen under conditions which will produce oxidation of the metal relatively easily oxidized while preventing substantial oxidation of the metal which is relatively difficult to oxidize.

Other objects and features of the invention will become apparent as the description proceeds, especially when taken in conjunction with the accompanying drawings, wherein.

The present invention deals with the provision of an electrically conducting film or layer comprising an intimate molecular mixture of a metal and an inorganic di-electric metallic compound.

As the metals to be employed in forming the electrically conducting films with the di-electrics there may be employed any solid metal which may be thermally evaporated in a vacuum or sputtered. Thus, we may for example, employ copper, gold, silver, aluminum, platinum, rhodium, nickel, iron, cobalt, tin, titanium, cadmium, zinc, chromium, manganese, palladium, magnesium, zirconium, vanadium, lead, arsenic, antimony, and bismuth. There may also be employed under special circumstances where the product is isolated in a dry atmosphere or vacuum such metals as sodium or calcium.

As the inorganic di-electric metallic compounds there may be employed such metallic compounds as metallic oxides, metallic sulfides, or metallic halides, or a metal sulfate or other stable di-electric metallic compounds. We have found that the metallic oxides such as those of lead, silver, aluminum, magnesium, zinc, and other rare earth metal oxides, and the oxides of cadmium, antimony, bismuth, mercury, copper, gold, platinum, palladium and other heavy metal oxides when applied over glass or other siliceous surfaces, are extremely highly adherent to such surfaces and that furthermore, they are highly adherent to the metals. Such oxides may be employed mixed with the metals to produce our electrically conducting layers. We have also found that other metallic compounds may be used as the di-electric with the metal in forming our electrically conducting films. Thus, as metallic compounds that are generally highly effective we may use the sulfides, selendides, tellurides, sulfates, selenates, tellurates, halides such for example as fluorides, or other compounds relating to the metallic oxides which we have indicated above and derived from the indicated metals. More particularly we have found that the inorganic metallic compounds of any metal in the form of a sulfide, selenide, telluride, sulfate, selenate, or tellurate, or the halides of such metals may be employed. The choice of a specific metallic di-electric will of course be dictated by other considerations such as water insolubility, light stability, and ability to evaporate the material or to form it upon a glass surface in a vacuum chamber operation. For example, as sulfides we might readily use as our di-electric a deposit of a sulfide of antimony, lead, zinc, cadmium, tin, arsenic, bismuth, iron, nickel, cobalt, copper or silver. These would be generally useful. We might also use the sulfides of sodium, potassium, or calcium but in such case the product would have to be one where the coating was sealed within a vacuum continuously since such coatings are rapidly destroyed by absorption of moisture when directly exposed to air. That is, these materials are suitable in dry evacuated systems but are not useful in products exposed to air. On similar consideration we have found the use of lead selenide, lead sulfate, lead telluride, and lead tellurate as being of particular use in forming the desired coating.

While most sulfates are water soluble, lead sulfate is quite non-soluble and can be used to secure good stable products for use in ordinary atmospheres. While all metallic sulfates and inorganic metallic sulfates might be employed, it is obvious that where we employ a water soluble one such as zinc sulfate, that the layer should be kept within a dry water-free atmosphere or in a vacuum since water absorption will cause loosening of the coating.

As suitable metallic halides there may be employed lead bromide, lead chloride, lead fluoride, lead iodide, or silver chloride. While all metallic halides or compounds of a metal with an element of the halogen family, namely, bromine, chlorine, fluorine or iodine, may be employed, it is obvious that those just listed have the advantage of being stable to light, and of being water insoluble. It would be obviously possible to use light sensitive halides such as silver bromide in a transparent electrically conducting structure in which an amber or ultra violet opaque glass was employed in which the amber protected the halide from the photochemical action. However, it is possible to use water soluble materials such as sodium chloride, sodium fluoride, chromium fluoride, magnesium chloride, calcium chloride, or iron chloride, if the coated articles which are produced are maintained in a dry atmosphere or in a vacuum so that the coatings are protected against absorbing water and loosening from the glass by the water soluble metallic halide being displaced from the glass surface. Other suitable water insoluble metallic fluorides which may be employed are magnesium fluoride and lithium fluoride.

There may be also employed other suitable dielectrics such as magnesium silico-fluoride. We may also employ mixed oxides or compounds of these such as the spinels, as the di-electric. For example, a molecular mixture of magnesium oxide and aluminum oxide or the ordinary so-called spinel may be employed as the di-electric. It is also within the scope of the present invention to employ more than one di-electric, provided one is an inorganic metallic compound, within any given layer and it is also obvious that our electrically conducting layers might be made where more than one metal is employed in the composition, such mixed metals constituting an approximation to known alloys such as copper and nickel in a ratio similar to Monel, or for example the nickel chromium mixture known as Nichrome. With these particular alloys one can secure such ratios of the metals present readily by directly evaporating such alloys as they distill in thermal evaporation without any substantial composition change.

Inasmuch as the electrically conducting film or layer disclosed herein is of a thickness such that it is not self-supporting and cannot be used apart from supporting structure, it will normally be applied to a supporting body, either directly to a surface of the support body or to the surface of a previously applied layer or coating. In some cases optical properties of the resulting body are significant in which case the surface of the support to which the layer is applied will be an extremely smooth surface such as a polished glass surface. Such would be the case for electrically conducting vehicle windows or optics. However, where the resulting article is to be employed by virtue only of its electrical properties, the surface need not be smooth or highly polished and excellent results have been obtained when the layer has been applied to a porous ceramic surface.

It will be appreciated that the electrical resistances given in the following examples and mentioned throughout this specification are given as ohms per square area and that such electrical resistivities are as usual, the reciprocals of electrical conductivity, thus, the lower the electrical resistance the better the electrical conductivity, and if a film has an electrical resistance of 100 ohms per square it has such a resistivity regardless of whether the square is one inch on the side or one foot on the side.

In applying the products of the invention to specific applications the desirability of securing very low electrical resistance or high electrical conductivity becomes emphasized in the choice of voltage at which the electrically heated window or lens, etc., must be operated in order to provide such energy. The voltage E required to supply a given amount of energy W to a square of treated glass one square foot in area, when the current is applied to a square of glass, can be determined by the following simple formula in which R is indicated as the electrical resistance.

$$E=\sqrt{WR}$$

Furthermore, within the limits permitted by a specific application, it is of course best to maintain a window to a minimum width in one direction since by elongating in the other and attaching the electrodes along the long edges, one secures the advantages of having a number of resistances thus connected in parallel.

Lenses employed in the goggle of a helmet used in cold or freezing weather have always been subject to clouding up due to condensation and freezing of the breath upon the same, and the initial transparency of the glass is rapidly destroyed. In airplanes and other fast moving vehicles such as trains which are moving through cold strata of air, there exists a very serious problem of condensation of moisture, or under more severe conditions, actual ice formation upon the windows of the vehicle. In the case of airplanes the icing of the windows has presented a very serious problem. If heat could be applied to such surfaces during use the objectionable clouding and freezing over might be eliminated, but the application of heat as such directly cannot normally be conveniently carried out. The articles prepared in accordance with this invention carry an electrically conducting coating thereon which permits the direct generation of heat in contact with the glass, light transmitting windows, or viewing lenses at all points over the surface of such glasses. In the determination of the necessary amount of heat which must be brought to a glass surface to prevent icing, for example in an airplane, it is found that a tremendous amount of heat such as between 2,000 and 4,000 British thermal units per square foot per hour must be supplied. To supply so much energy to a square foot of glass surface continuously requires a very efficient means of producing the heat directly in contact with the glass so that the heat may be carried through the glass to the front surface exposed directly to the cold atmosphere or directly developed on such front exposed surface. This large amount of heat when considered in terms of the amount of electrical energy which must be supplied, for example to a windshield four feet by one foot, runs into some 4,000 watts and from such a figure it immediately becomes apparent that for any conductor to be applied to the surface of the glass to heat the same and supply such an amount of energy, the conductor must be one of a very high degree of conductivity.

Experience has indicated that the electrical resistivity of such an electrically conducting film should be less than 100 ohms per square and at all events, not more than 150 ohms per square. At the same time experience has shown that for transparent closures suitable for a windshield and the like, a light transmission of not less than 50% is essential. In fact, it is a present requirement of windshields that they shall transmit at least 70% of normally incident light. Accordingly, in the present invention the light transparent electrically conducting film, when used as a windshield, is preferred to have an electrical resistivity of not more than 150 ohms per square while preserving a light transmission property of not less than 50%, and preferably of not more than 100 ohms and a relatively high light transmission of not less than 70%.

Thus, in the case of an airplane it has been estimated that it is necessary to supply between 2,000 and 3,000

British thermal units per square foot per hour, or an average of 800 watts per square foot to the window to prevent icing. If 800 watts per square foot are to be generated within a glass having a resistance of 100 ohms when current is passed across a one square foot piece, the voltage required would be 283 volts. Since in moving vehicles it is highly advantageous to avoid electrical circuits which involve high voltages due to the danger inherent in accidents or particularly inherent in short circuits developing in wet weather, it becomes highly desirable that any electrically conducting glass to be used in a moving vehicle be not substantially of greater resistance than this figure, and in all events have a resistance per square of not more than 150 ohms, and in general it is desirable for the resistance per square to be at a lower value to thereby permit operation with reduced voltages. It will be obviously apparent that the requirements for heat upon an automobile or train windshield be far less than that required for an airplane, estimates ranging from 50 to 75 watts per square foot, and that consequently the articles of this invention may be employed upon such vehicles at reasonable voltages.

With a man walking in a minus 60 degrees Fahrenheit temperature with a helmet employing a partially transparent lens of the invention of three square inches, the heat demand to prevent fogging and icing has been estimated at around 1 watt per square inch. With such a lens of square shape and 1.7 inches on a side and 10 ohms resistance, a voltage of only 6 volts is necessary, which may conveniently be supplied by a small dry cell battery or hand operated generator.

Figure 1:
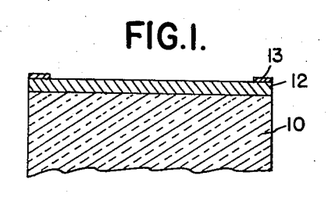
Figure 1 is a fragmentary sectional view showing a layer constructed in accordance with the present invention applied directly to a support body, for example a siliceous body, such for example as glass, and having electrodes applied to the opposite ends of the electrically conducting layer.

Referring now to the drawings, in Figure 1 there is illustrated a support body 10 which in the present case may be a transparent or opaque body and which may be a glassy siliceous material. The electrically conducting film or layer is illustrated at 12 and is shown in this figure as applied directly to a surface of the body 10. In accordance with the foregoing disclosure the electrically conductive film or layer comprises an intimate molecular mixture of a metal and an inorganic di-electric metallic compound. The film or layer as disclosed in this figure may be of uniform composition or variable composition. Electrodes 13 are shown at each end of the layer as means of passing current through the film.

Figure 2:
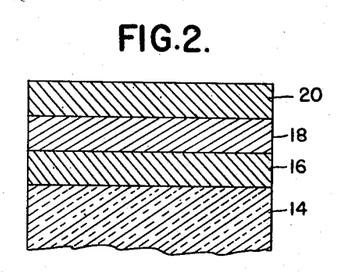
Figure 2 is a fragmentary sectional view of an electrically conducting beam splitter or dichroic mirror.

In Figure 2 there is shown a construction which is both electrically conducting and partially transparent and partially reflecting which may be employed as a beam splitter to thus separate light into two different paths. The product approximately splits light into approximately two equal beams by reflection and transmission with some absorption loss where the three separate layers are each approximately one-quarter wave length thick as referred to visible yellow light of 5500 Angstrom units. In the Figure 14 is a transparent glass support, 16 is a layer of titanium dioxide applied thereto by thermal evaporation from a filament, and layer 18 is a successive layer applied on layer 16 by thermal evaporation of magnesium fluoride. Subsequently, in the same vacuum there was evaporated from a third filament a mixture of 20% metallic titanium and 80% of titanium dioxide by weight. This top layer 20 was electrically conducting and provided the article with such properties, the conductivity being 100,000 ohms per square area. A modified form of the same product which has the property of selectively reflecting a high amount of blue light and selectively transmitting a high amount of the remainder of the visible spectrum or amber light is made in the same manner with the same three types of layers with the exception that each layer is made to be a quarter wave length of light with reference to 4,000 Angstrom units blue light. The product in this case is then a selective reflecting and transmitting dichroic mirror or filter which is at the same time electrically conducting and which may be used with cathode ray apparatus to prevent building up of static charges on such an optical unit.

Figure 3:
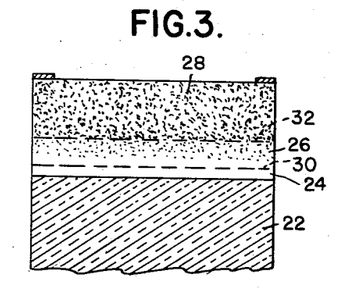
Figure 3 is a fragmentary sectional view illustrating the use of our electrically conducting layer as an intermediate layer between a di-electric layer and a metallic layer and in which suitable electrodes are shown.

In Figure 3 there is shown a variation of the present invention in which the film or layer comprising a mixture of metal and the di-electric material is disposed intermediate an adhesive layer and a layer composed of pure metal. In this figure a support body is illustrated at 22 and again may be a glass body. Upon a surface of the glass body there is deposited a relatively thin adhesive layer 24 which may be composed of a metallic compound effective to adhere strongly to glass and to provide adhesion for subsequently applied layers. On the outer surface of the adhesive layer 24 there is deposited the layer 26 which comprises an intimate mixture of metal and the inorganic di-electric metallic compound. Finally, there is deposited the outer layer 28 which is in this case illustrated as a layer of pure metal. The layer 26 is a graduated layer in which the portion of the layer adjacent the surface of the adhesive layer 24 is composed entirely or almost entirely of the di-electric material. If the di-electric inorganic metallic compound material in the layer 26 is the same material which is employed as the adhesive layer 24, it will be appreciated that no optical interface exists between the layers 24 and 26 and accordingly, the boundary between these layers is illustrated in the present figure as the broken line 30. The proportion of metal to di-electric inorganic metallic compound material in the layer 26 increases progressively from the layer 24 to that portion of the layer 26 adjacent the metal film 28 and preferably, the outer portion of the intermediate film 26 is composed entirely of metal and in this case preferably of the same metal as occurs in the film 28. As a result of this there is no optical interface between the films 26 and 28 and accordingly, the boundary between these films is indicated in the figure as the broken line 32. As a result of the foregoing construction there is applied to the glass body 22 a metal film 28 which may be transparent, partially transparent, or opaque, and which has a conductivity substantially equal to the conductivity of the massive metal. At the same time the metal film 28 is adhered to the glass by means which avoids the occurrence of optical interfaces with resulting improvement in optical properties for certain purposes.

Figure 4:
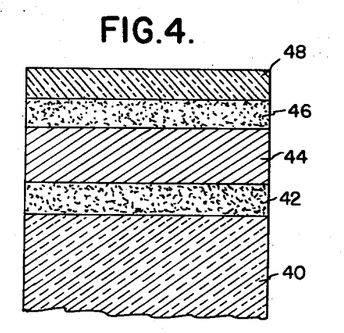
Figure 4 is a fragmentary sectional view of an electrically conducting window suitable for use in a vehicle or optic goggles.

In Figure 4 there is illustrated an article comprising a support body 40 which may be a glass body. Applied to the outer surface of the glass body 40 is a film or layer 42 which in the present instance is an intimate molecular mixture of a metal and an inorganic di-electric metallic compound. In the present case this mixture may be of uniform composition throughout or it may be of a gradually varying composition. Applied to the outer surface of the layer 42 is an intermediate film 44 of metal. Applied to the outer surface of the layer 44 is a film or layer 46, again comprising an intimate molecular mixture of a metal and a di-electric inorganic metal compound. In the present case an outer layer 48 is applied to the layer 46 and may comprise a layer of silica. In a specific example the layers 42 and 46 comprised an intimate molecular mixture of iron oxide and gold. The intermediate metallic layer 44 comprised gold. The article illustrated in Figure 4 is useful as an electrically heated windshield or the like.

Figure 5:
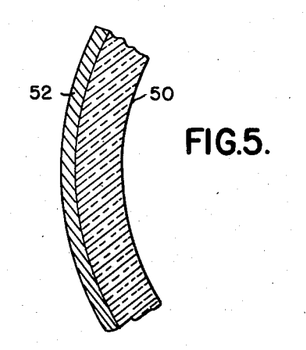
Figure 5 is a fragmentary sectional view of an electrically heated lens or goggle.

Referring now to Figure 5 there is illustrated the application of the electrically conducting film to a goggle 50, the film being indicated at 52 and applied directly to the outer convex surface of the goggle.

Figure 6:
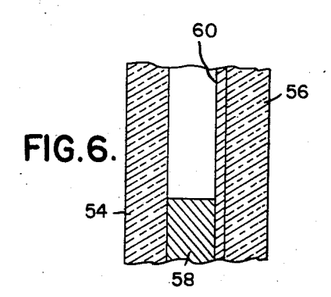
Figure 6 is a fragmentary sectional view through a double glazed window, one pane of which is provided with the electrically conducting film.

In Figure 6 there is illustrated a portion of a double glazed window comprising panes of glass 54 and 56 connected along two opposite edges by metallic spacers 58, the spacers at the other two edges being of di-electric material. The glass 56 is illustrated as having applied thereto a transparent conducting film 60 which is applied directly to the inner surface of the glass 56. The electrically conducting film 60 in the present instance is of course highly transparent and comprises an intimate molecular mixture of a metal and an inorganic di-electric metallic compound. Electric current is applied along opposite edges of the electrically conducting film 60 by suitable contacts which may be constituted by the metal spacers 58.

Figure 7:
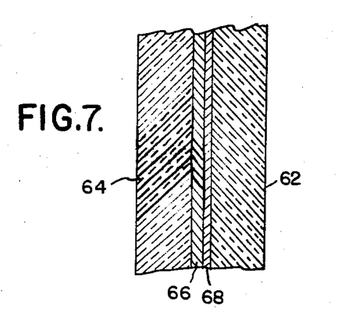
Figure 7 is a fragmentary sectional view through a laminated glass article such for example as a windshield, one ply of the glass having the electrically conducting film applied thereto.

In Figure 7 there is illustrated a windshield of the well known safety glass construction which comprises outer and inner sheets of glass indicated at 62 and 64 respectively. These sheets of glass are assembled into a sandwich with an interposed layer 66 of a suitable plastic material such for example as polyvinyl butyral or other plastic of approximately a preferred refractive index of about 1.5. By the choice of plastic of such approximate refractive index, it is found that the reflection from the coated surface is decreased upon lamination. A highly transparent electrically conducting film 68 is carried by the inner surface of the glass sheet 51 and is adhered thereto. With the parts in the relationship illustrated in this figure the windshield is designed for use with the glazed sheet 62 as the outer or forward sheet of a windshield.

Figure 8:
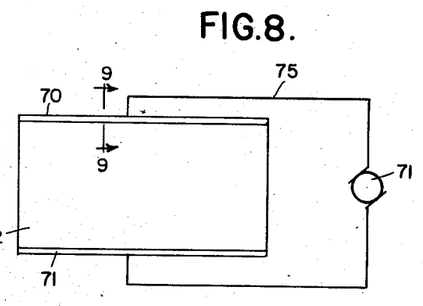
Figure 8 is a diagrammatic view illustrating a windshield and showing the manner in which the electrical circuit is completed through the electrically conducting film.

Referring now to Figure 8 there is diagrammatically illustrated the manner of providing an electric circuit for a windshield. In this case elongated contacts 70 and 71 are provided along the long edges of the windshield 72, it being understood that the windshield 72 is provided with a transparent electrically conducting film of the type disclosed herein. An external source of current is indicated at 74 for connection by conductor 75 to the contacts 70 and 71, thus causing the current to traverse the metal film of the windshield.

Figure 9:
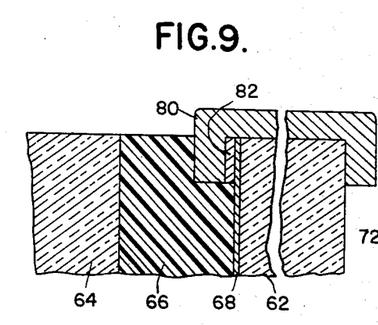
Figure 9 is an enlarged fragmentary sectional view on the line 9—9, Figure 8.
Figure 10:
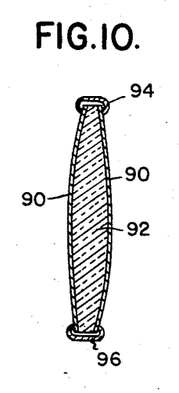
Figure 10 is a sectional view through a double convex lens having an electrically conductive film applied to the opposite sides thereof so that the lens may be employed as a magnetic shutter in a polarized light system.

In Figure 9 there is illustrated an enlarged section of Figure 10 showing the manner of attachment of a contact 80 to the electrically conducting film 68 which may be that illustrated in Figure 7. In this case the electrically conducting film 68 is adhered to the glass sheet 62. The glass sheet 62 is assembled with the glass sheet 64 by the intermediate ply of plastic 66 as described above. In order to provide a good contact between the contact element 80 and the electrically conducting film 68, additional metal is provided as indicated at 82. This may be done by additional thermal deposition of material along the edges of the article or it may be applied otherwise, such for example as by spraying. Such metal for contacting may also be applied in any of the present products by directly electroplating metal on the desired portions using masking protective lacquer coatings to protect the main face of the product desired to be free of such electroplated electrode areas. The electroplating current is fed directly into the first produced electrically conducting layer of the invention. In this figure contact 80 which may be a strip of thin copper, has its edge embedded in the plastic material 66 and is retained in firm pressure contact with the metal 82 in the final assembly. The electric leads to the source of current may be applied to the contact 80 at the face of the glass.

In Figure 10 there is illustrated the application of the electrically conducting films 90 to both sides of a double convex lens 92. It will be understood that in this case the electrically conducting films are adhered directly to the surface of the glass. In this figure there is also illustrated electrical contacts 94 and 96 for supplying current to the electrically conducting coatings. It will be understood that the contacts 94 and 96 are provided in the form of arcs of circles having portions extending in area contact with peipheral portions of the electrical conducting films and that the contacts 94 and 96 are separated from each other and that the current is completed between the contacts 94 and 96 through the electrically conducting films 90.

Figure 11:
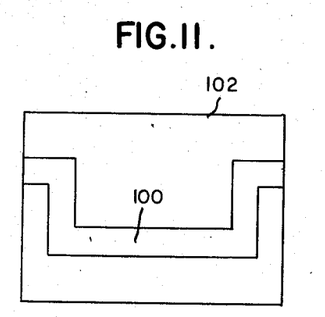
Figure 11 is a front elevational view of an electrically conducting film or layer applied in a definite pattern to a portion only of the surface of a support body.

In Figure 11 there is illustrated another application of the present invention in which the electrically conducting film is shown at 100 as applied in the form of a pattern to a support body such for example as a window pane 102. In this case the article may be useful as a burglar alarm, interruption of a current passing through the electrically conducting film 100 by breakage of the glass being effective to actuate an alarm.

We have found that there are practically no adhesional forces between metals and glass or siliceous surfaces, as can be seen when adhesive tape is applied directly to metal coatings which are directly applied to glass. When stripping the tape the metal will strip off very readily. This was one of the difficulties in attempting to prepare electrically conducting articles. The articles produced under this invention will when subjected to the adhesive tape test, successfully resist any pulling away from the glass or siliceous surface showing that there are strong bonds between the surface and the electrically conducting layer.

The articles constructed in accordance with the disclosure herein, exhibited very great resistance to separation of the electrically conducting film from the support body and a surprising resistance to abrasion, and this is accomplished without in any way detracting from optical properties. The electrically conducting film is molecularly adhered to the siliceous support by the action of the di-electric metallic inorganic compounds. Where a transparent or optical article is desired it is preferable that the surface be smooth, and by smooth surface we use the term in its ordinary sense. It need be only sufficiently smooth to prevent visible or optical apparent light diffusion at such surface and sufficiently smooth to insure the avoidance of electrical hot spots by presenting a base upon which the electrically conducting film can be formed in a satisfactory layer. However, in many instances our invention can be formed on superficially rough ceramic bases. In the forming of articles by the present invention where the surface is smooth it is apparent that the smoothness of the surface of the support body will be reproduced in the outer surface of the electrically conducting layer. Thus, if the smooth face of the support body is polished to have an extremely smooth finish this finish will be reproduced in the interfaces or surfaces presented by the electrically conducting layer.

It is one of the advantages of the present invention that electrically conducting articles can be made upon optically required surfaces without destroying or altering such finer ground and polished faces.

Where it is desired that the electrically conducting film be both of a very high electrical condutivity and of a relatively high transparency, it is preferable that we employ gold, silver, copper, iron or nickel as the metal to provide the requisite combination of properties. It further becomes apparent that when we desire to make a window we also wish to avoid developing any reflection properties in such window, particularly as for example in an automobile windshield where action of the windshield as a mirror would be highly undesirable. Generally speaking, we have found the use of gold to give us preferred products for use in windshields, windows and optical lenses by reason of this material providing highest light transmission with the highest electrical conductivity and at the same time, the lowest light reflection properties, and further, by reason of its complete inertness to oxidation or chemical change.

It will be apparent that the desired electrical conductivity in any product may be produced by altering either the total amount of metal and total amount of di-electric, or the ratios of these two materials to each other by weight, or by altering the choice of di-electric and metal taken in forming the film. Thus, the thickness, the composition, and the nature of components are the controlling factors in securing the desired electrical conducting, optical, and other properties of the products of the invention. Thus, it is possible in accordance with the present invention to produce an electrically conducting film having a high or even an extremely high resistivity approaching for example that of uncoated glass which may have substantial thickness and as a result of such thickness have substantial strength, durability, and hardness, and furthermore, as a result of such thickness being readily controllable as to the exact amount of its electrical resistance properties. Also, in accordance with the present invention it now becomes possible to produce a film of any predetermined thickness and having a definite predetermined value of electrical resistance. It is thus possible to produce for example, a quarter wave length film which may have any desired electrical resistance.

*Example 1*

In a filament in a thermal evaporation vacuum chamber there was loaded 0.310 gram of gold, and in a second filament there was loaded 0.040 gram of titanium dioxide. A sheet of plate glass was placed 21 inches away from these filaments and each was electrically heated and the materials were caused to evaporate simultaneously over the same evaporation time. The product showed a reflection value on the coated side of 16½%, a reflection on the uncoated side of 5½%, and a light transmission of 56%. The electrical resistance value was 9,000 ohms per square.

The product was useful as a radar plotting screen which provided suitable optical properties and was static eliminating. The amount of gold used in forming this example was sufficient that if deposited directly by itself it would have been 45 Angstrom units thick, and the amount of titanium if deposited as a single layer, would have been sufficient to have given a layer 27 Angstrom units thick. The ratio of weight of the two materials taken was such that the gold was 88.6% by weight in the final mixture and by volume approximately 62.5%. Since it is not known whether there is any contraction or expansion in volume when gold is mixed with titanium dioxide it cannot be stated definitely that the thickness of the deposited film of the mixture would be exactly the sum of the two values given, but it can be assumed that such expansion or contraction effects are not large and that the deposited film of the mixed materials would be approximately equal to the sum of the calculated thicknesses, or approximately 72 Angstrom units thick. It is also apparent that such considerations will apply in all of the following examples where various metals and various de-electrics are used in producing our mixed electrically conducting films.

*Example 2*

In a similar setup in a thermal evaporator chamber there was simultaneously evaporated gold and aluminum oxide into a plate of Pyrex glass. In the one filament 0.298 gram of gold was loaded, and in the second filament there was loaded 0.034 gram of aluminum oxide. The product showed a reflection from the coated side of 14%, a reflection from the uncoated side of 5%, and a light transmission of 62%. The electrical resistance was 400 ohms per square.

In preparing this example the gold used was sufficient that it would have provided a layer 43 Angstrom units thick and the aluminum oxide would have provided a layer 24 Angstrom units thick. The gold was 90.2% by weight of the mixture and 64% by volume of the mixture.

*Example 3*

This product was constructed similarly to that shown in Figure 3, in which the two materials were evaporated so that the product was not of a uniform composition throughout but was of a graded composition. In producing Example 3 a mixture of 0.303 gram of gold and 0.032 gram of chromium oxide were mixed and jointly applied to a single filament 21 inches away from a glass plate. When the filament was heated the chromium oxide started to distill at a lower temperature than the gold and there was first deposited a very thin layer of pure chromium oxide. As the temperature was quickly increased on the filament there was distilled over a mixture of chromium oxide and gold, in which the proportion of gold rapidly increased, and finally the last part of the material deposited was pure gold. The product showed on the coated side a reflection of 14%, a reflection of 6% from the uncoated side, and a light transmission of 67% with an electrical conductivity of 30 ohms per square. It was excellent in hardness and generally would provide a very satisfactory windshield for airplane use.

The amount of gold was sufficient that it would normally when deposited by itself provide a layer 44 Angstrom units thick, and the chromium oxide would have provided a layer approximately 17 Angstrom units thick. The percentage of gold by weight employed was 91% and by volume 72%.

*Example 4*

In a single filament in a thermal evaporation chamber there was loaded a mixture of 0.302 gram of gold with 0.037 gram of iron oxide ($Fe_3O_4$). The filament was placed 21 inches away from the plate of clear glass and after a vacuum was established the filament was gradually heated and in this case, both the iron oxide and gold started to distill, with the more easily distillable iron oxide coming over in greater proportion. Thus, there was produced upon the glass sheet a layer of a graded composition in which the iron oxide was of greatest concentration closest the glass surface and the iron oxide decreased in proportion as the coating became thicker, and the last part of the coating was pure gold. The product showed a reflection on the coated side of 13%, a reflection of 6% on the uncoated side, a light transmission of 71%, and an electrical resistivity of 30 ohms per square.

In this example, the gold employed was sufficient by itself to provide a layer having a thickness of 44 Angstrom units, while the iron oxide would have given by itself a layer 20 Angstrom units thick. The percentage of gold was 89% by weight and 68.8% by volume.

*Example 5*

A product which was quite suitable for use in windshields and windows was prepared by setting up three separate filaments within a high vacuum chamber with a sheet of glass placed 21 inches away from the filaments. The three filaments were separately fired successively and from the first filament there was evaporated a load of 0.013 gram of iron oxide ($Fe_3O_4$), which gave a first layer on the glass of iron oxide. Immediately thereafter, in the vacuum there was evaporated from the second filament a mixture of iron oxide and gold which had been applied to such filament. There was applied to the filament 0.008 gram of iron oxide and 0.026 gram of gold. This very small amount of each material evaporated very quickly and was assumed to be a slightly graded film in which the proportion of the two materials varied from the one boundary to the other. On top of this there was then deposited from the third filament 0.274 gram of pure gold. Thus, there was produced a product with an adhesive layer of iron oxide adjacent the glass and then a graded layer of iron oxide and gold which was electrically conducting, and on top of this a further pure gold layer. While the latter film was relatively thick compared to the others and supplied most of the electrical conduction, it is apparent that the intermediate layer also supplied electrical conductivity. The final product showed a light reflection value from the coated side of 13%, a light reflection of 6% from the uncoated side, and a light transmission of 70½%. The electrical conductivity was 55 ohms per square. This product was baked for three hours at 600 degrees Fahrenheit with the object of oxidizing the iron oxide layers to the highest iron oxide, namely, $Fe_2O_3$, to thereby increase the light transmission. In such final product then there was a mixture of iron oxide ($Fe_2O_3$) and gold. This product showed a reflection from the front or coated surface of 11%, a reflection of 6% from the uncoated surface, a light transmission of 74%, and an electrical resistance of 40 ohms per square. Thus, the baking improved the light transmission but did not substantially alter the electrical conductivity, thus illustrating the excellent stability of the electrical conductivity in these products to heat.

In preparing this example, the first adhesive layer of iron oxide deposited upon the glass would be 7 Angstrom units thick. The graded layer next deposited thereon was a mixture in which the gold was 76.5% by weight and 50% by volume. The gold was sufficient to form a layer 4 Angstrom units thick while the iron oxide would produce a layer 4 Angstrom units thick. The subsequently applied pure gold layer was 40 Angstrom units thick.

*Example 6*

A product was made which had the construction of Figure 4. In making this product there was provided within a thermal evaporation chamber four separate filaments which were fired successively. The glass plate which was to be used as an airplane windshield, was placed 21 inches away from these filaments. In the first filament fired there was applied a mixture of iron oxide ($Fe_3O_4$) and gold. The amount of iron oxide was 0.009 gram and the amount of gold was 0.021 gram. This gave a deposit which was very thin and which undoubtedly graduated from a higher composition of iron oxide adjacent the glass to a higher gold content on its top surface. The second filament was immediately fired thereafter and from it there was evaporated 0.275 gram of gold. On top of this gold layer there was next evaporated from the third filament a charge of 0.009 gram of iron oxide and 0.021 gram of gold. This filament again would be graduated just as the first filament was. On top of this, as a protective layer, there was evaporated from a fourth filament 0.400 gram of silica. This latter film provided a quarter wave coating of silica and had the effect of reducing the reflection in the product. The third layer which comprised a mixture of gold and iron oxide acted to provide adhesion between the silica layer and the underlying gold layer. The product produced showed a reflection value from the coated side of 30%, a reflection value of 12½% from the uncoated side, and a light transmission of 70%, with the electrical conductivity being 70 ohms per square. This was also baked for ten hours at 600 degrees Fahrenheit, as in Example 5, and the physical properties then were 5% reflection from the coated face, 9% from the uncoated face, and a light transmission of 79½%. The electrical resistance was then found to be 34 ohms per square. The product was extremely hard, very durable, and had excellent color light transmission which made it suitable for use as an electrically heated window for use in airplanes, its properties and color being such that it looked practically like ordinary glass.

In making this four-layer product the gold in the initial graded layer was sufficient to form a thickness of 3 Angstrom units, and the iron oxide was sufficient to form a layer 5 Angstrom units thick. Thus, the graded layer was approximately 8 Angstrom units thick and in this layer the gold was approximately 70% by weight and approximately 38% by volume. The second layer was a layer of pure gold of a thickness of 40 Angstrom units. The third layer was another graded layer which in character and thickness was the same as the first layer. The final layer deposited was of pure silicon dioxide of approximately 485 Angstrom units thick. Thus, in this product the first three layers which are electrically conducting, had a total thickness of approximately 56 Angstrom units, and the product as completed was of a total thickness of approximately 541 Angstrom units.

*Examples 7, 8 and 9*

It has been found that when the metals gold, platinum, palladium, and silver are sputtered in a vacuum in which there is a residual amount of oxygen such as from evacuating an air filled chamber, that the deposit is to a very large degree composed of oxides of these metals. These would seem to be formed from the exposed atoms while they are still slightly warm at the time of deposition or immediately thereafter by bombardment with ozone which is formed in the glow discharge and which is always present at the same time sputtering is carried on in the presence of oxygen. Thus, in the case of sputtering of the metals gold, silver, platinum and palladium, the deposits formed are found to be very adherent which is not true for very thin coatings of such pure metals as shown when they are applied by thermal evaporation where the same are readily wiped off by rubbing the finger across them. In the case of sputtering silver for example, it is found that when a coating has been built up which is so thick that it has only a light transmission of less than one-half of one percent, that the electrical resistance which should be very low for such a thick film, is of the order of 1,400,000 ohms per square. Further, on looking through such a film the color is a deep amber whereas the color of pure silver metal deposited on glass by thermal evaporation or chemical deposition is of a pure blue color. Furthermore, the front surface reflectivity of such an opaque sputtered deposit is found to be only 20% which contrasts with pure silver coating reflectivity of 94%. It is apparent that the deposit is a mixture of silver with silver oxide. Silver oxide is an ember shade by transmission and is not electrically conducting but it is adherent to glass and is light absorptive and not particularly light reflective. It is therefore apparent that the sputtered silver film produced in the presence of oxygen is a mixed silver and silver oxide film which may be employed as a highly resistant article.

When silver is sputtered in a residual hydrogen atmosphere, it is found that the deposit secured appears blue by transmission but readily wipes away from the glass with the finger. Further, the deposit in this case is indicated as being silver metal additionally by a relatively high electrical conductivity and light transmission and reflectivity. For example, in one case, a coating produced by sputtering silver in hydrogen showed an electrical resistance of 70 ohms with a light transmission of 38% and a front surface reflectivity of 32%. A heavy film produced in the same manner showed an electrical resistivity of 16 ohms, a lesser light transmission of 25%, and a front surface reflection of 78%.

Deposits formed by sputtering platinum in residual air are of a brown-black nature by light transmission, and in the case of a deposit showing approximately ½% light transmission the electrical resistances were found to be within a range of 18,000 to 65,000 ohms with a front surface reflection of 30%. These deposits which would seem to be a mixture of platinum and platinum oxides contrast with a film deposited by sputtering in hydrogen which shows a front surface reflection of 33% and a light transmission of 30%. This film, sputtered in hydrogen, was of a bluish-gray color when viewed by transmitted light and was not at all adherent. The electrical resistivity of this latter film varied from 600 ohms to 4,000,000 ohms showing that while it was mostly metal it was an unconsolidated spotty type deposit just as was found to be true with the silver sputtered in hydrogen. Similarly, with gold, the deposits formed by sputtering in residual air were tight and of a dark blackish-brown color. An example of such a film showed 21% light transmission, 36% front surface reflectivity, and 28,000 ohms per square electrical resistance. These figures clearly indicate the deposit to be a mixture of gold and gold oxides. When gold is sputtered in hydrogen the deposit is not at all adherent, is of better electrical conductivity at a given light transmission, but is in such properties far poorer than the consolidated continuous films of gold which are secured by the methods of our parent invention. The deposits sputtered in hydrogen take on the same general characteristics as those of the directly thermally evaporated gold deposits on glass; namely, they show various colors depending upon the relative sizes of the gold spots formed on the glass. The deposits made either by thermal vacuum evaporation or sputtering in hydrogen directly on uncoated glass with gold show purple, green, blue or red colors by reflection and show scattered light effects by reflection. The colors of these films originate from diffraction effects as determined by the particle size of the individual gold spots.

*Example 10*

In a high vacuum chamber there was evaporated onto a plate of glass a coating composed of 20% metallic titanium with 80% titanium dioxide. The coated product showed a reflection from the front surface of 28% and a light transmission of 30%. The product thus showed considerable light absorption but the equal values of reflection and transmission made the product useful as a beam splitter providing two equal light beams. The product also had an electrical conductivity of 100,000 ohms per square which thus made it useful as an electrically conducting beam splitter for optical use. The coating applied in this particular case was such that the final film was approximately 600 Angstrom units thick. This particular coating could also be employed in the forming of other optical units and in particular, might comprise the top or outer layer described in respect to Figure 2.

*Examples 11, 12 and 13*

In a vacuum chamber were placed four pieces of clean glass and a piece of glazed porcelain. The pieces of glass were arranged respectively at six inches, ten inches, fourteen inches, and twenty inches away from the evaporating filament and the porcelain piece was also placed twenty inches away. From a single filament there was evaporated a mixed charge of 0.110 gram of iron and 0.318 gram of iron oxide ($Fe_3O_4$). In the vacuum the material was evaporated to give a rather heavy film on the glass placed at six inches and progressively lighter coatings on the glass pieces placed further away from the filament. On each of the pieces the material comprised a graded deposit which had a relatively large amount of iron in the part first deposited and a decreasing amount of iron as the thickness of the coating increased, due to the higher vapor pressure of the iron as compared with the iron oxide at the same filament temperature. The grading produced however was the same in all of the pieces of glass although the grading was naturally provided throughout a greater thickness on the piece of glass coated at six inches as compared to the piece coated at twenty inches. The amount of iron taken by weight was 26.3% of the total mix and this was approximately 18.6% by volume.

The piece of glass located six inches from the filament received a very heavy coating which was approximately 2588 Angstrom units thick since the amount of iron evaporated onto such plate was sufficient to give a thickness of 488 Angstrom units and the amount of iron oxide evaporated was sufficient to have given a coating of 2100 Angstrom units thickness. This particular product showed an electrical resistivity of 150 ohms per square. It was completely opaque but had a reflection from the coated surface of 15%, and a reflection when measured through the glass of 28%. The higher reflection when measured through the glass is indicative of the higher amount of iron in the first deposited coating.

The piece of glass which was coated at ten inches from the filament had thereon a mixed coating in which the iron was sufficient to provide a thickness of 172 Angstrom units and iron oxide which would have given a film of 756 Angstrom units thick. In this case the product showed an electrical resistivity of 200 ohms per square, a light transmission of 2%, a reflectivity from the coated side of 16%, and a reflectivity when measured through the glass of 36%.

The glass which was coated at a distance of fourteen inches from the filament had thereon a film which was built up of sufficient iron to have given a thickness of 86 Angstrom units, and iron oxide to have given a thickness of 378 Angstrom units, or approximately a total thickness of 464 Angstrom units. This product also showed an electrical resistivity of 200 ohms per square, a light transmission of 14% in accord with its thinner coating, a reflection from its coated side of 16%, and a reflection when measured through the glass of 42%.

In the case of both the glass and the porcelain ceramic piece coated at twenty inches from the filament, the iron deposited was sufficient to have built up a coating of 43 Angstrom units, and the iron oxide would have provided a coating of 189 Angstrom units or approximately 232 Angstrom units total thickness. These products showed an electrical resistivity of 300 ohms per square, a light transmission of 25%, a reflection from the coated face of 38%, and a reflection measured through the glass of 32%.

*Examples 14, 15, 16 and 17*

In a manner similar to the preparation of the just preceding samples, four pieces of plate glass were coated at the same respective distances from the filament, evaporating from the filament a mixture of 0.159 gram of titanium and 0.231 gram of the same iron oxide. In this mix there was approximately 40.7% titanium by weight and 44% titanium by volume. The deposits as formed on the glass pieces were graded films in which there was a greater percentage of titanium in the first deposited part of the films and lesser amounts in the final deposited parts.

The piece coated at six inches had sufficient titanium applied thereto to form a thickness of 1200 Angstrom units and sufficient iron oxide to form 1535 Angstrom units, so that the total thickness of the layer employed was approximately 2735 Angstrom units. The product had an electrical conductivity of 80 ohms per square, a zero light transmission, a reflectivity of 12% from the coated side, and a reflectivity through the glass of 28%.

The piece coated at ten inches away from the filament had a total thickness of 984 Angstrom units since there was sufficient titanium evaporated thereon to have produced 432 Angstrom units, and enough iron oxide to have produced 552 Angstrom units. The coated piece showed an electrical resistivity of 350 ohms per square, a light transmission of 16%, a reflectivity from the coated side of 20%, and a reflectivity measured through the glass of 38%.

The same prepared at fourteen inches away from the filament in a similar manner had approximately a total thickness of 492 Angstrom units and an electrical resistivity of 900 ohms per square, a light transmission of 34%, a reflectivity from the coated side of 27%, with a reflectivity measured through the glass of 19%.

The sample prepared at twenty inches away from the filament had a total thickness of approximately 246 Angstrom units, and an electrical conductivity of 3000 ohms per square, with a light transmission of 48%, a reflectivity from the coated side of 20%, and a reflectivity measured through the glass of 9%. It is apparent that this last sample could be employed as a radio frequency shield around a light generating tube such as a luminous fluorescent tube, and thereby provide transmission for light while restricting passage of the concurrently produced radio frequency waves.

*Examples 18, 19 and 20*

From a filament there was evaporated in a high vacuum chamber 0.155 gram of copper and simultaneously, 0.155 gram of magnesium fluoride. The mixture thus contained 50% metal by weight and 25.5% by volume. The deposit was formed upon glass pieces placed separately at thirteen inches, seventeen inches, and twenty-one inches away from the filament. The glass placed at thirteen inches had the thickest coating thereon and showed an electrical resistance of 20 megohms, or 20 million ohms, a light transmission of 56%, a reflection from the coated side of the glass of 14%, and through the glass the reflectivity measured 6%.

The glass piece coated at seventeen inches showed an electrical resistivity of 200 megohms, a light transmission of 68%, a reflection from the coated side of 12%, and a reflection through the glass of 5%.

The other glass, coated at twenty-one inches away from the filament, showed an electrical resistivity of 1000 megohms, a light transmission of 78%, a reflection from the coated side of 10%, and a reflection through the glass of 6%. The coatings in each case were well mixed and were substantially uniform.

The copper deposited on the pieces of glass placed at thirteen inches, seventeen inches and twenty-one inches were respectively of a thickness of 126 Angstrom units, 74 Angstrom units, and 48.5 Angstrom units. In the same respective cases the thickness of magnesium fluoride deposits were 375 Angstrom units, 214 Angstrom units, and 144 Angstrom units.

*Examples 21 and 22*

In a high vacuum chamber there was evaporated from a single filament a mixture of 0.0184 gram of nickel and 0.184 gram of nickel oxide. Thus, the amount of nickel was approximately 9% of the total by weight, and 7.75% by volume. A glass was coated by placing it at ten inches away from the filament and on this glass there was received a deposit which showed an electrical resistance of 260 ohms per square, a light transmission of 58%, with a reflectivity from the coated side of 15%, and a reflectivity through the glass of 5%.

Similarly, a glass located at seventeen inches away from the filament showed an electrical resistivity of 1200 ohms per square, a light transmission of 63%, a reflectivity from the coated side of 11%, and a reflectivity through the glass of 5%. Obviously, these two products could have been employed as static dissipating transparent screens or plotting boards.

The thickness of the nickel deposited on the piece placed at ten inches away from the filament was 25.4 Angstrom units and the thickness of the nickel oxide was 312 Angstrom units. In the case of the second piece of glass the thicknesses of nickel was 9 Angstrom units and of the nickel oxide 108 Angstrom units. The two products in this case were graded films in which there was a greater proportion of nickel in the film just adjacent to the glass.

*Examples 23, 24, and 25*

From a single filament in a high vacuum chamber there was evaporated a mixture of 35% chromium and 65% chromium oxide by weight. The actual weights of material taken were 0.105 gram of chromium and 0.195 gram of chromium oxide. This was evaporated upon glass plates placed respectively at thirteen inches, seventeen inches, and twenty-one inches away from the filament.

The piece of glass placed at thirteen inches away from the filament received a deposit which had 11% light transmission, 30% reflection from the coated side, and 30% when measured through the glass. The product had an electrical conductivity of 1000 ohms per square.

The glass piece prepared at seventeen inches away from the filament had a light transmission of 17%, a reflection on the coated side of 38%, and a reflection through the glass of 32%. The electrical conductivity was 1250 ohms per square.

The third piece of glass coated at twenty-one inches had a light transmission of 25%, a reflection from the coated side of 36%, and a reflection through the glass of 24%. The electrical conductivity was 1400 ohms per square.

*Examples 26, 27, and 28*

From a single filament within a high vacuum chamber there was evaporated a mixture of 0.060 gram of chromium and 0.140 gram of zinc sulfide. The deposit was formed upon glass pieces placed at thirteen inches, seventeen inches, and twenty-one inches away from the filament.

The closest piece showed a coating having 500 ohms per square and a light transmission of 30%. The reflectivity from the coated surface was 38% and measured through the glass the value was 17%.

The piece of glass held at seventeen inches showed a conductivity of 830 ohms and a light transmission of 38% with the reflectivities as 28% and 11% from the coated and uncoated sides respectively.

The glass coated at twenty-one inches had an electrical resistance of 2000 ohms and a light transmission of 50%. The light reflectivity from the coated side was 19.5% and from the uncoated side 8%.

The deposits were graded deposits in which the zinc sulfide was of highest concentration adjacent the glass surface and of lesser concentration as the thickness of the films increased.

The drawings and the foregoing specification constitute a description of the improved electrically conducting coated glass or ceramic articles suitable for use as a lens, a window or a windshield, or the like, in such full, clear, concise and exact terms as to enable any person skilled in the art to practice the invention, the scope of which is indicated by the appended claims.

What we claim as our invention is:

1. An electrically conductive transparent article comprising a body of siliceous material, a continuous transparent electrically conductive layer carried by said body, said layer being deposited by molecular deposition and composed essentially of an intimate molecular mixture of metal and a metallic inorganic dielectric compound, in which said di-electric compound consists of a metal cation and at least one anion selected from the group consisting of oxygen, sulphur, selenium and tellurium, the layer being substantially uniform in thickness, the proportion of metal to the di-electric compound in said layer and the thickness of said layer being such that said layer is electrically conductive and serves to carry the major portion of electrical current carried by said article.

2. An article as defined in claim 1 in which the proportion of metal to di-electric compound is constant throughout the layer.

3. An article as defined in claim 1 in which the proportion of metal to di-electric compound is variable throughout the layer.

4. An article as defined in claim 3 in which the proportion of metal varies progressively from 0% to 100% from one surface of said layer to its other surface.

5. An article as defined in claim 1 in which said layer is applied directly to a surface of said body.

6. An article as defined in claim 1 in which said layer is an intermediate one of a plurality of layers applied to a surface of said body.

7. An article as defined in claim 1 in which said article comprises a second layer composed of the same di-electric compound as occurs in said first mentioned layer, and a third layer composed of the same metal as occurs in said first mentioned layer, said second and third layers contacting opposite surfaces of said first mentioned layer, the proportion of metal to di-electric compound in said first mentioned layer varying progressively from 0% at the surface of said first mentioned layer in contact with said second layer to 100% at the surface of said first mentioned layer in contact with said third layer.

8. An electrically conductive transparent article comprising a body of transparent material having a smooth continuous surface, an electrically conductive continuous transparent layer on said smooth surface and carried by said body, said layer composed essentially of an intimate molecular mixture of metal and a metallic inorganic dielectric compound, in which said dielectric compound consists of a metal cation and at least one anion selected from the group consisting of oxygen, sulphur, selenium and tellurium, the layer being substantially uniform in thickness, the proportion of metal to the dielectric compound in such layer and the thickness of said layer being such that said layer has substantial electrical conductivity and serves to carry the major portion of electrical current carried by said article with the light transmission of the article being at least 50% and the outer surface of said layer being substantially smooth.

9. An article as defined in claim 8 in which said metallic inorganic di-electric compound is chromium oxide.

10. An article as defined in claim 8 in which said metallic inorganic di-electric compound is nickel oxide.

11. An article as defined in claim 8 in which said metallic inorganic di-electric compound is aluminum oxide.

12. An article as defined in claim 8 in which said metallic inorganic di-electric compound is iron oxide.

13. An article as defined in claim 8 in which said metallic inorganic di-electric compound is titanium oxide.

14. An article as defined in claim 8 in which said metal is chromium.

15. An article as defined in claim 8 in which said metal is nickel.

16. An article as defined in claim 8 in which said metal is iron.

17. An article as defined in claim 8 in which said metal is titanium.

18. An article as defined in claim 8 in which said metal is gold.

19. An article as defined in claim 8 in which said metallic inorganic di-electric compound is chromium oxide and said metal is chromium.

20. An article as defined in claim 8 in which said metallic inorganic di-electric compound is nickel oxide and said metal is nickel.

21. An article as defined in claim 8 in which said metallic inorganic di-electric compound is aluminum oxide and said metal is gold.

22. An article as defined in claim 8 in which said metallic inorganic di-electric compound is iron oxide and said metal is gold.

23. An article as defined in claim 8 in which said metallic inorganic di-electric compound is titanium oxide and said metal is titanium.

References Cited in the file of this patent

UNITED STATES PATENTS

| | | |
|---|---|---|
| 2,021,661 | Kisfaludy | Nov. 19, 1935 |
| 2,429,420 | McMaster | Oct. 21, 1947 |
| 2,628,927 | Colbert | Feb. 17, 1953 |

FOREIGN PATENTS

| | | |
|---|---|---|
| 625,198 | Great Britain | June 23, 1949 |

UNITED STATES PATENT OFFICE

CERTIFICATE OF CORRECTION

Patent No. 2,852,415 September 16, 1958

William H. Colbert et al.

It is hereby certified that error appears in the printed specification of the above numbered patent requiring correction and that the said Letters Patent should read as corrected below.

Column 2, line 55, for "Patent No. 2,628,727" read -- Patent No. 2,628,927 --; column 8, line 49, for "selendides" read -- selendies --; column 18, line 33, for "ember" read -- amber --; column 20, line 25, for "38%" read -- 28% --.

Signed and sealed this 16th day of December 1958.

(SEAL)
Attest:

KARL H. AXLINE
Attesting Officer

ROBERT C. WATSON
Commissioner of Patents